(12) United States Patent
Ting

(10) Patent No.: US 7,503,500 B2
(45) Date of Patent: Mar. 17, 2009

(54) CARD CONNECTOR WITH ANTI-MISMATING DEVICE

(75) Inventor: Chien-Jen Ting, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 432 days.

(21) Appl. No.: 11/164,499

(22) Filed: Nov. 25, 2005

(65) Prior Publication Data

US 2007/0057056 A1 Mar. 15, 2007

(51) Int. Cl.
*H01R 27/02* (2006.01)
*H01R 31/00* (2006.01)
*H01R 33/88* (2006.01)
*H01R 33/90* (2006.01)
*H01R 33/92* (2006.01)
*H01R 33/94* (2006.01)
*G06K 7/00* (2006.01)
*G06K 13/06* (2006.01)
*G06K 13/24* (2006.01)

(52) U.S. Cl. .................. 235/483; 235/486; 439/638
(58) Field of Classification Search .................. 235/441, 235/486, 483; 439/541.5
See application file for complete search history.

(56) References Cited

U.S. PATENT DOCUMENTS

| 5,035,633 | A | | 7/1991 | Kobayashi et al. |
| 5,643,001 | A | * | 7/1997 | Kaufman et al. ............ 439/159 |
| 6,120,322 | A | * | 9/2000 | Ho et al. .................. 439/541.5 |
| 2005/0247786 | A1 | * | 11/2005 | Chen .......................... 235/441 |

* cited by examiner

*Primary Examiner*—Le Thien Minh
*Assistant Examiner*—Thien T Mai
(74) *Attorney, Agent, or Firm*—Wei Te Chung

(57) ABSTRACT

A card connector (100) includes an insulating housing (10), first and second sets of contacts (22, 24) received in the insulating housing (10), a protection door (40) and a mating member (4821). The insulating housing (10) defines a receiving space (18) with a first entrance opening (19). The protection door (40) moveably covers the first entrance opening (19) for receiving a first card and the protection door (40) defines a second entrance opening (46) smaller than the first entrance opening (19) therein for receiving a second card and is formed with a guiding device (48) for guidable insertion of the second card. The mating member (4821) is disposed on the guiding device to securely engage with the insulating housing when the second card is inserted into the receiving space (18).

16 Claims, 10 Drawing Sheets

CARD CONNECTOR WITH ANTI-MISMATING DEVICE

CROSS-REFERENCE TO RELATED APPLICATIONS

This application is related to U.S. patent application Ser. No. 11/095,277 filed Mar. 30, 2005 and entitled "CARD CONNECTOR WITH ANTI-MISMATING DEVICE", and assigned to the common assignee as the present invention.

FIELD OF THE INVENTION

The present invention is generally related to a card connector, and especially to a card connector with anti-mismating means for assuring different size/type cards can be correctly received in corresponding receiving spaces.

DESCRIPTION OF RELATED ART

It is popular to provide one single IC card connector with different sets of terminals at different locations to engage the different size/type IC cards which mutually exclusively enter the common receiving space defined in the card connector via the same entrance opening. Understandably, the housing of the card connector is provided some key/keyway in the guiding channels to guidably retain the inserted cards in position. However, sometimes a small dimensioned card may be inadvertently inserted into the entrance opening in an improper tilted manner that it may be uncontrollably led to an incorrect position, thus either damaging the terminals or being damaged by the terminals. The safest way is to provide different spaces and/or different entrance openings in the card connector, while it will increase the total thickness thereof that is opposite to the miniaturization trend. Accordingly, it is desired to provide a safe structure for the card connector to regulate different cards' insertion and not increase the thickness of the card connector.

U.S. Pat. No. 5,035,633 discloses a protection member which is located at an entrance opening of the card connector and can be moved either linearly or pivotally to allow the corresponding card to be inserted into the card connector for mating under a condition that the protection member is controlled by a locking member which moveably releasably locks the protection member while can be released by the inserted card when the correctly sized card is inserted into the card entrance opening.

However, sometimes a small sized card is still required to be inserted into and securely retained in the combo type card connector for mating with the corresponding contacts in the card connector. In order to solve the problem, it is expected to modify the protection member aforementioned U.S. Pat. No. 5,035,633 which is capable of retaining a small sized card in position when the small sized card is inserted into the receiving space for mating with the corresponding terminals while not obstructing insertion of a large sized card and not damaging the card connector.

Hence, an improved card connector is highly desired to overcome the aforementioned problem of the prior art.

SUMMARY OF INVENTION

Accordingly, an object of the present invention is to provide a card connector which has anti-mismating device to prevent card from mismating.

To achieve the above object, a card connector comprises an insulating housing, first and second sets of contacts, a protection door and a mating member. The insulating housing defines a receiving space with a first entrance opening. The first and second sets of contacts are received in the insulating housing and exposed in the receiving space. The protection door moveably covers the first entrance opening for receiving a first card and the protection door defines a second entrance opening smaller than the first entrance opening therein for receiving a second card and is formed with a guiding device for guidable insertion of the second card. The mating member is disposed on the guiding device to securely engage with the insulating housing when the second card is inserted into the receiving space.

Other objects, advantages and novel features of the present invention will be drawn from the following detailed description of a preferred embodiment of the present invention with attached drawings.

DETAILED DESCRIPTION

Figure 1:
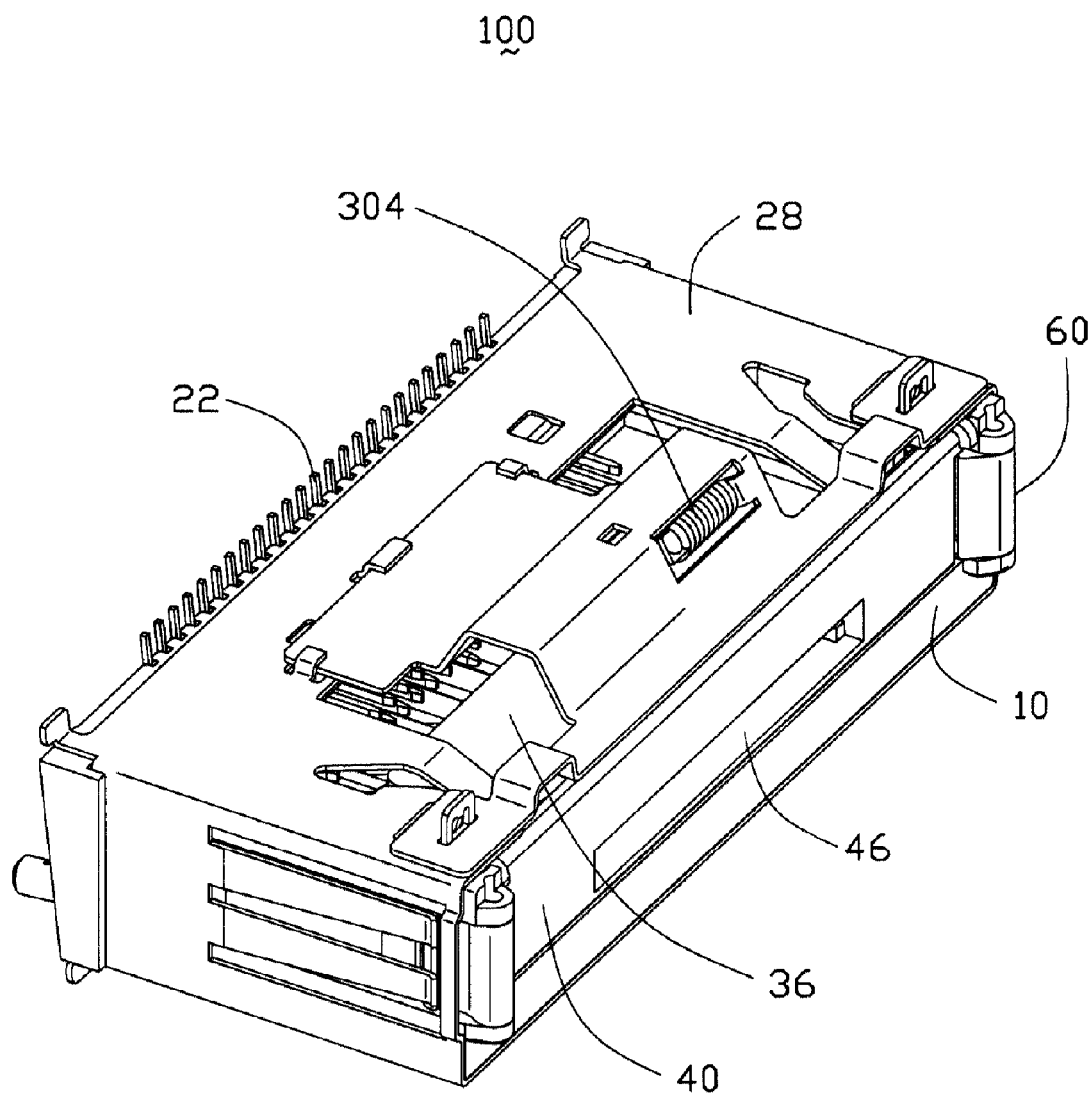
FIG. 1 is an assembled, perspective view of a card connector in accordance with the present invention.
Figure 2:
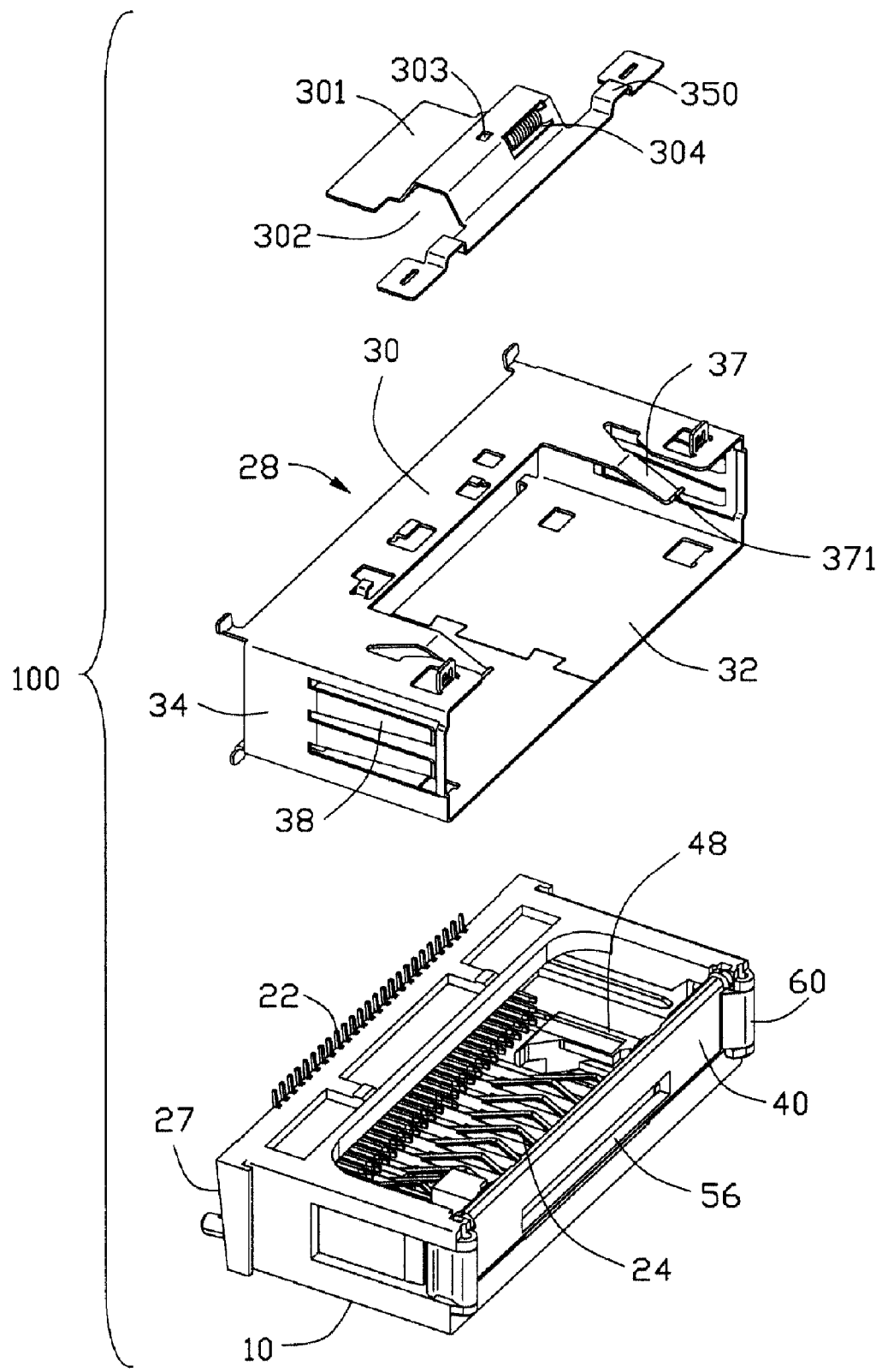
FIG. 2 is a partially exploded, perspective view of the card connector of FIG. 1.

Reference will now be made in detail to the preferred embodiment of the present invention.

Referring to FIGS. 1-10, the card connector in accordance with the present invention is adapted for receiving a first card, such as a CF card, and a second card 300, such as an SD card, is smaller than the first card in size.

The card connector 100 comprises an insulating housing 10 having opposite top wall 12 and bottom wall 14, opposite two side walls 16, and a rear wall 27 commonly define a receiving space 18 in the insulating housing 10. A first set of contacts 22 are disposed on the rear wall 27 and forwardly extending into the receiving space 18 for mating with the first card. A second set of contacts 24 are disposed on the bottom wall 14 and upwardly extending above an upper face of the bottom wall 14 and into the receiving space 18 for mating with the second card 300 (shown in FIG. 10). A first entrance opening 19 is formed in a front end of the insulating housing and in front of and in communication with the receiving space 18.

A shell 28 encloses the insulating housing 10 and comprises opposite top plate 30 and bottom plate 32, and opposite two side plates 34. The top plate 30 forms a large opening 36 therein and two resilient arms 37 thereon beside the large opening 36, and each side plate 34 forms a resilient arm 38 thereon. The shell 28 further comprises a detachable plate 301 disposed on the top plate 30 to cover an approximately middle portion of the large opening 36, then leave two cuts (not labeled) between the detachable plate 301 and the resilient arms 37. A free end 371 of each resilient arm 37 bends upwardly and the detachable plate 30 forms a pair of convex portions 350 protruding upwardly at opposite transverse ends of a front edge thereof.

Figure 3:
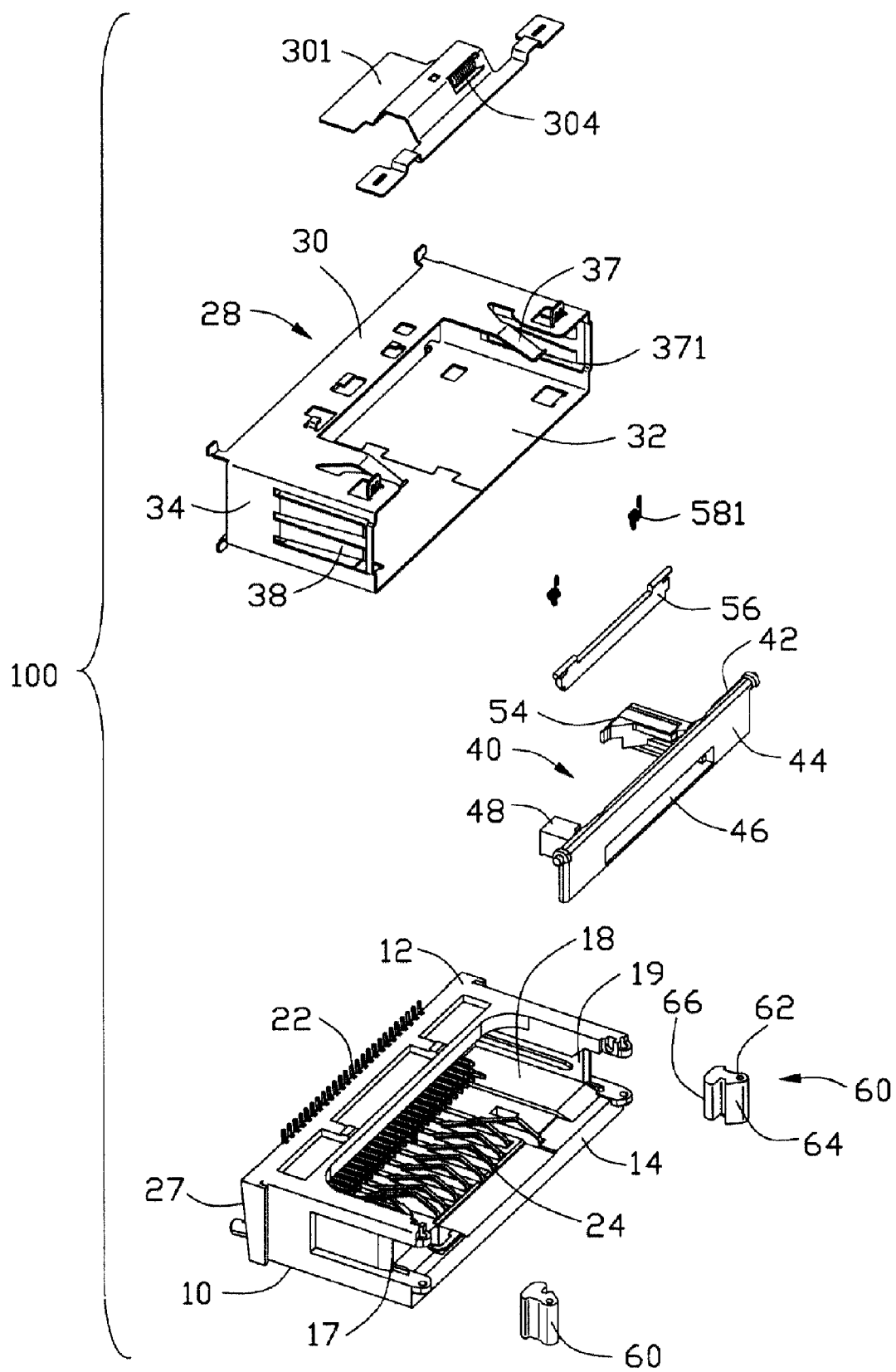
FIG. 3 is an exploded, perspective view of the card connector similar to FIG. 1.
Figure 6:
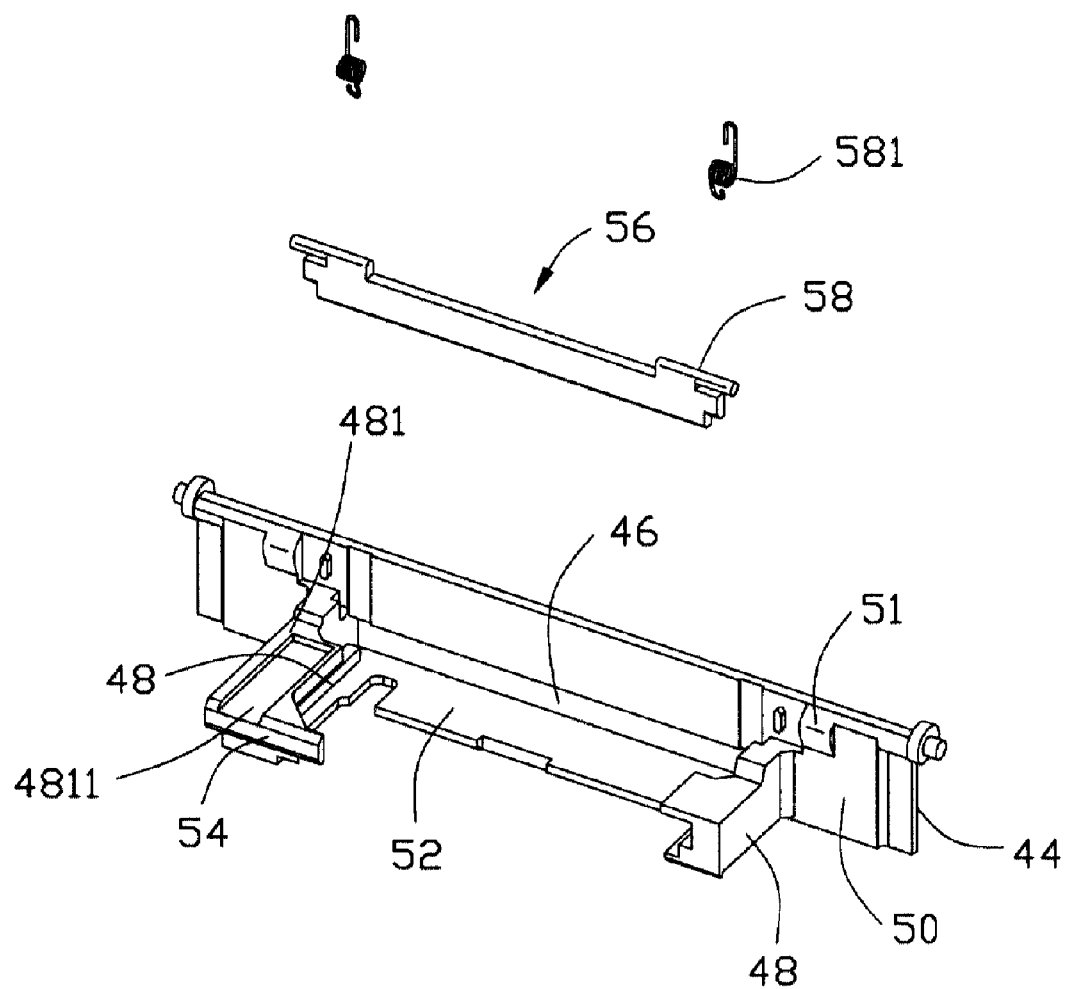
FIG. 6 is an enlarged, rear perspective view of the protection door, the associated pivotal door and a small resilient member of the card connector of FIG. 3.
Figure 7:
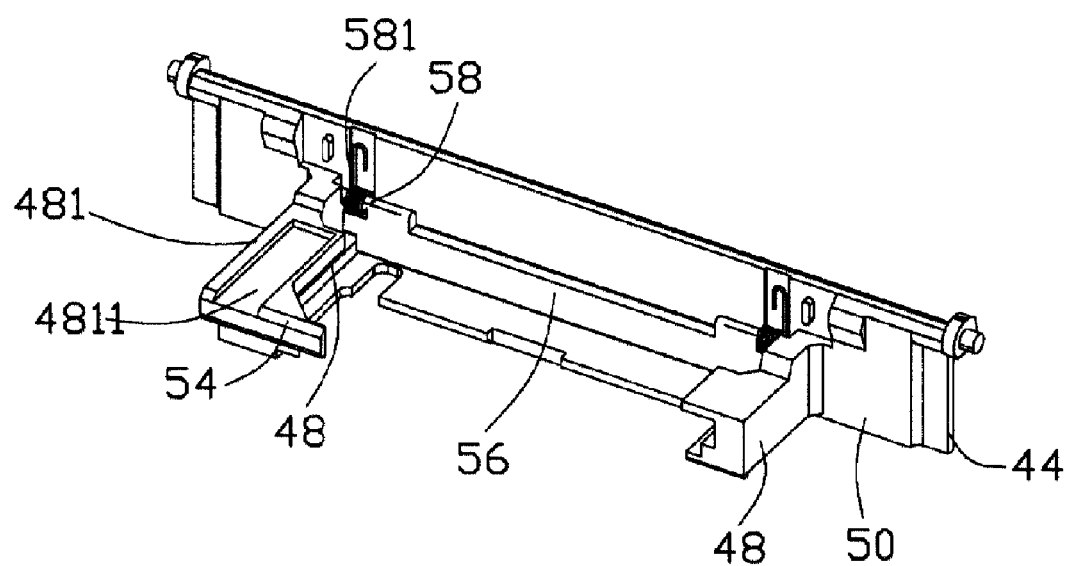
FIG. 7 is an assembled, rear perspective view similar to FIG. 6 wherein the pivotal door is in a closed position.

Referring to FIGS. 3 and 6, a protection door 40 having two opposite pivots 42 thereon, is pivotally mounted to the front end of the insulating housing 10 to moveably block the first entrance opening 19. The protection door 40 comprises a front plate 44 defining a cutout to form a second entrance opening 46 therein wherein in this preferred embodiment the second entrance opening 46 is essentially overlapped with a portion of the first entrance opening 19 and is smaller than the first entrance opening 19. A pair of guiding devices 48, such as guiding rails, extend rearward from a back surface 50 of the front plate 44 at positions right beside the second entrance opening 46. A supporting plate 52 integrally extends rearward from a bottom edge of the front plate 44 so as to cooperate with the pair of guiding rails 48 to hold the inserted second card 300 in position. A wedged stopper 54 is formed at the rear end of one of the guiding rails 48 for engagement with a wedged distal end of the second card 300. The one guiding rails 48 is formed with a recessed portion 4811 recessed from an upper surface 481 and a protruding block 4821 (shown in FIG. 9), served as a mating member, protruding downwardly from a bottom face 482 of the guiding rails 48. A pair of protrusions 51 are formed on an upper portion of the back surface 50.

A pivotal door 56 having two pivots 58 thereon, is pivotally mounted to the back surface 50 of the front plate 44 of the protection door 40 adjacent to the second entrance opening 46. A small resilient member 581, such as a spring, is disposed on the pivots 58 with one end elastically pressing the pivot door 56 and the other end elastically pressing the back surface 50 of the front plate 44. The pivotal door 56 moveably blocks the second entrance opening 46 on the back surface 50 of the front plate 44.

Figure 4:
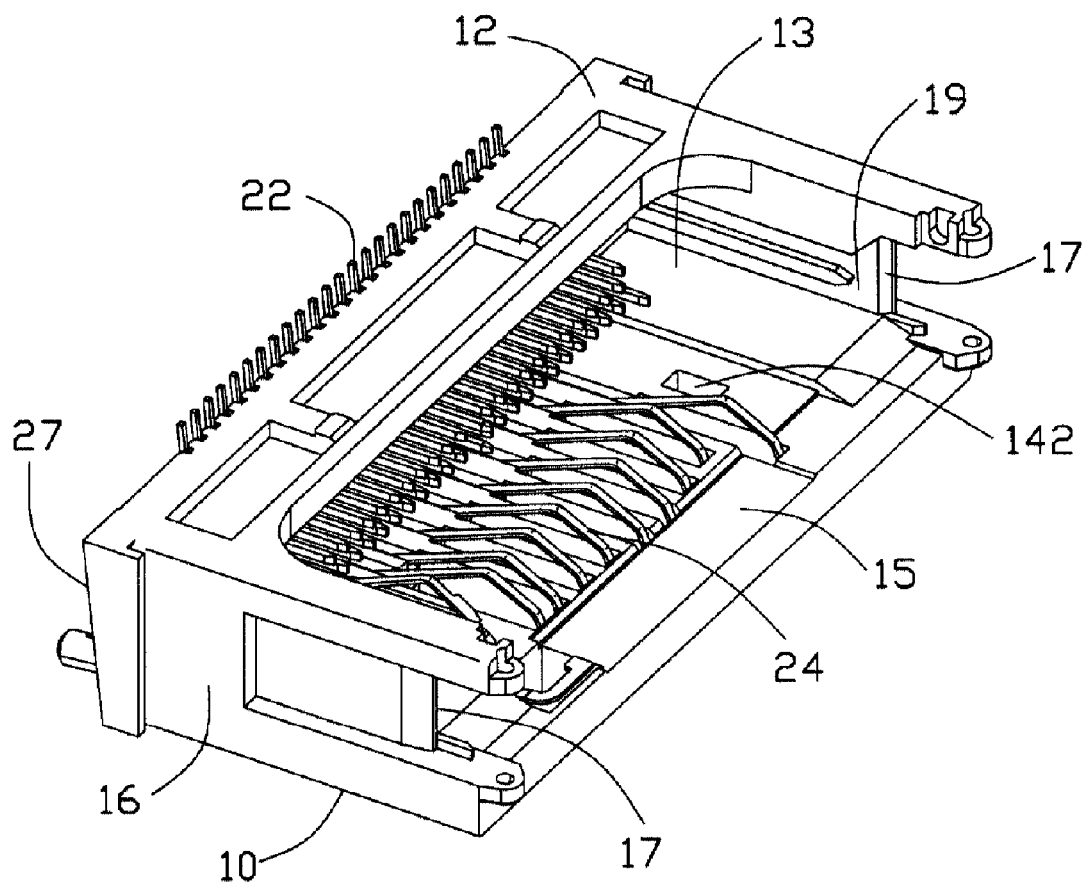
FIG. 4 is a partially assembled, perspective view of the card connector in FIG. 3 with a shell, a protection door, a pivotal door and a locking member not assembled.

Referring to FIGS. 3-4, the top wall 12 of the insulating housing 10 defines therein an opening 13 locating in alignment with the large opening 36 to accommodate the protection 40 therein when the protection door 40 is upwardly raised by the first card. The bottom wall 14 of the housing 10 defines therein a recess 15 to accommodate the supporting plate 52 and a rectangular hole 142 to accommodate the protruding block 4821 of the guiding arm 48 when the protection door 40 is in a closed position where only the second card 300 can be inserted into the receiving space 18. A pair of cutoffs 17 are formed in front ends of the corresponding sidewalls 16, respectively. A pair of locking members 60 having two pivots 62 thereon, are pivotally mounted in the corresponding cutoffs 17, respectively.

Each of the locking member 60 includes a confrontation surface 64, at the front, adapted to be actuated to move by the first card, and a locking surface 66, at the back, adapted to block rearward movement of the protection door 40 if the locking member 60 is not actuated by insertion of the first card.

Figure 8:
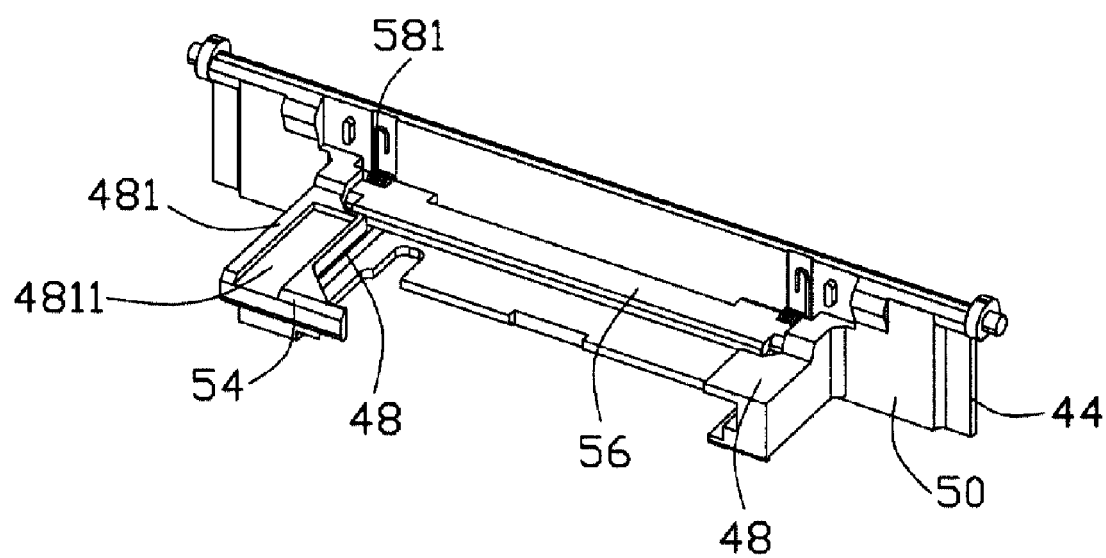
FIG. 8 is an assembled, rear perspective view similar to FIG. 7 wherein the pivotal door is in an open position.

Referring to FIGS. 1 and 8, the detachable plate 301 of the shell 28 comprises a holding portion (not labeled) with a large resilient portion 304, such as a spring, assembled on. One end of the resilient portion 304 elastically presses the detachable plate 301 and the other end is to press an upper surface of the recessed portion 4811 of the guiding arm 48 to urge the protection door 40 return to the closed position.

When no card in received in the receiving space 18, the protection door 40 in the closed position to cover the first entrance opening 19 under a condition that the pivotal door 56 is in a vertical portion to cover the second entrance opening 46. Under this situation, when the first card is inserted into the receiving space 18 through the first entrance opening 19, two side edges of the first card confront and push away the confrontation surface 64 of the locking member 60 to have the locking member 60 rotated outwardly so as to have the blocking surface 66 disengaged from the protection door 40. Therefore, the further rear movement of the first card pushes and upwardly raises the protection door 40 under a pivotal manner to have the guiding rails 48 run through the cuts between the detachable plate 301 and the resilient arms 37, and then have the front plate 44 essentially located in a horizontal position. In this course, the resilient member 304 is urged to elastically deform by the recessed portion 4811 of the guiding arm 48 of the protection door 40.

When the first card is withdraw from the housing 10 via a reverse procedure, the protection door 40 is pushed back to the original closed position by the restoration force generated by the resilient member 304 and the resilient arms 37 which are urged by the corresponding protrusions 51 of the back surface 50 of the front plate 44 of the protection door 40 when the first card is received in the receiving space 18. Meantime, the locking member 60 are also pushed inward back to the original locked position by the resilient arms 38, respectively.

Oppositely, if no first card is available, a second card 300 is also allowed to be inserted into the receiving space 18 via the second entrance opening 46 wherein the pivotal door 56 is upwardly raised by the inserted second card 300 to a horizontally position under a condition that the protection door 40 is locked by the locking member 60. In this course, the small resilient member 581 is urged to elastically deform by the pivotal door 56. The inserted second card 300 is snugly retained by the pair of guiding rails 48 and the bottom plate 52. Furthermore, because the protruding block 4821 of the one guiding rail 48 is interferentially received in the hole 142 of the housing 10, the one guiding rail 48 can not deflect to a right side of the protection door 40 in order to prevent the guiding rail 48 from damaging in case an insertion force of the second card 300 is too large.

When the second card 300 is withdraw from the housing 10, the pivotal door 56 is pushed back to the closed position by a restoration force generated by the resilient member 581 to block the small entrance 46.

Figure 5:
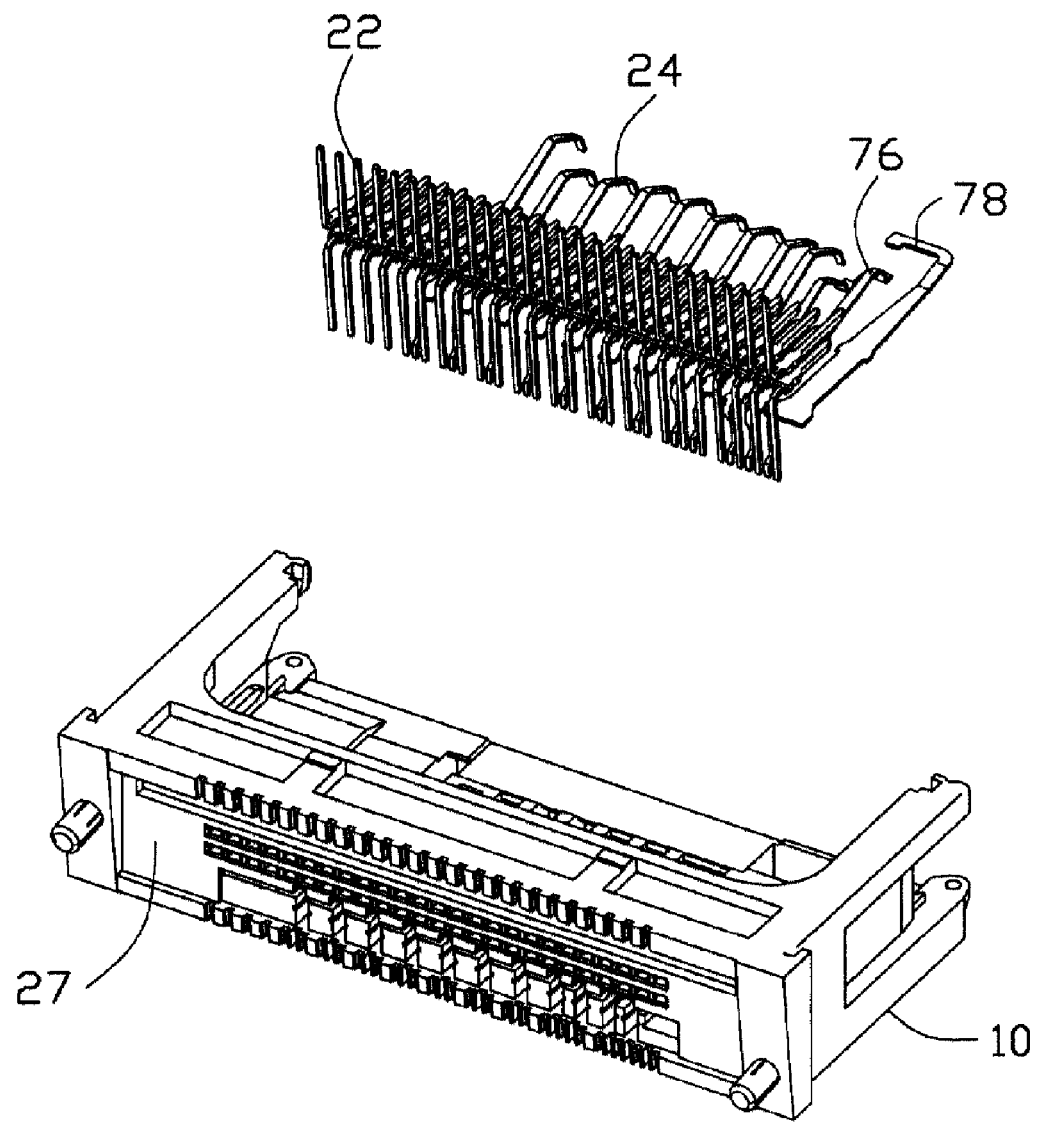
FIG. 5 is an exploded, perspective view of the card connector of FIG. 4.
Figure 9:
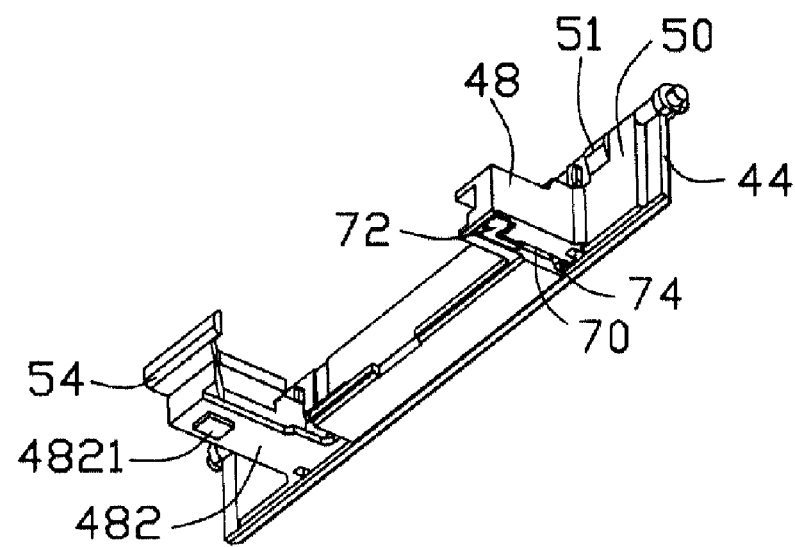
FIG. 9 is a partially exploded, perspective view of the card connector of FIG. 2 with the shell not shown.
Figure 9:
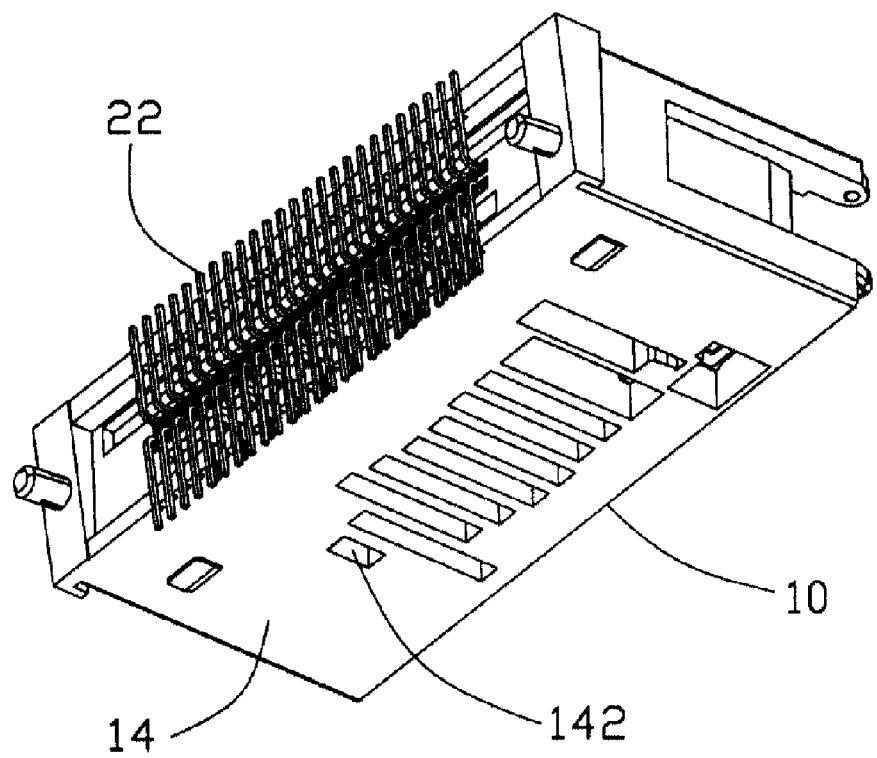
Figure 10:
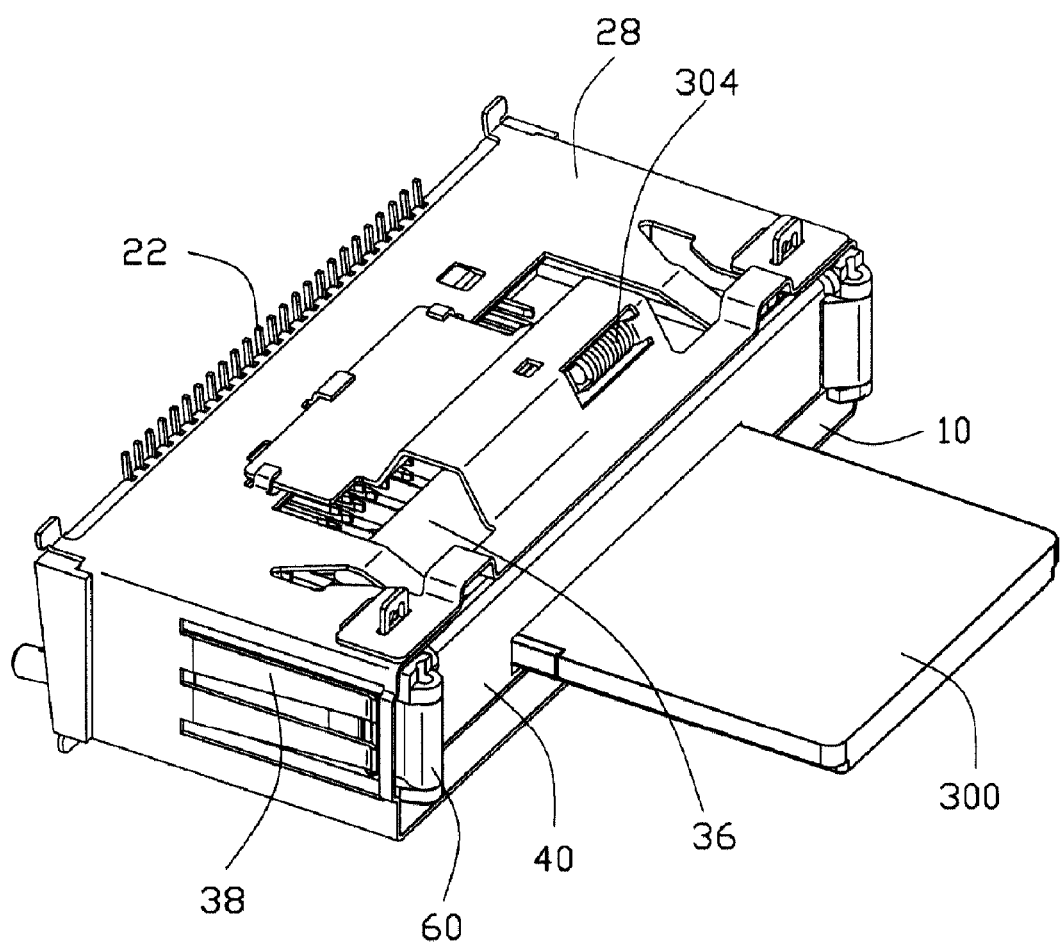
FIG. 10 is an assembled, perspective view of the card connector of FIG. 1, showing insertion state of a second card.

Referring to FIGS. 5 and 9, a moveable first switch contact 70 is associated located on the protection door 40 having a first contact end 72 and a second contact end 74. A stationary second switch contact 76 and a third switch contact 78 are disposed in the insulating housing 10. The second switch contact 76 comprises a contact section adapted to engage with the first contact end 72 of the first switch contact 70 when the protection door 40 is in the closed position. The third switch contact 78 is adapted to engage with the second contact end 74 of the first switch contact 70 when the protection door 40 is in the closed position and the second card 300 pushed rearward away the pivotal door 56 and is inserted into entrance opening 46.

While a preferred embodiment has been shown and described, equivalent modifications and changes known to persons skilled in the art according to the spirit of the present invention are considered within the scope of the present invention as described in the appended claims

What is claimed is:

1. A card connector comprising:
an insulating housing defining a receiving space with a first entrance opening;
first and second sets of contacts received in the insulating housing and exposed into the receiving space;
a protection door moveably covering the first entrance opening for receiving a first card, the protection door defining a second entrance opening smaller than the first entrance opening for receiving a second card and the protection door formed with a guiding device for guidable insertion of the second card; and
a mating member disposed on the guiding device; wherein when the first card is inserted from the first entrance, the mating member is separated from the insulating housing; when the second card is inserted from the second entrance, the mating member is securely engaged with the insulating housing.

2. The card connector as claimed in claim 1, wherein the guiding device protrudes into the receiving space from the protection door.

3. The card connector as claimed in claim 1, wherein the mating member is received in a bottom wall of the insulating housing.

4. The card connector as claimed in claim 3, wherein the mating member is formed on a bottom surface of the guiding device.

5. The card connector as claimed in claim 1, further comprising a moveable locking member releasably locking the protection door which is released if the moveable locking member is actuated to move by the first card.

6. The card connector as claimed in claim 5, wherein the protection door is pivotally moved with respect to the insulating housing.

7. The card connector as claimed in claim 5, further comprising a pivotal door associated with the protection door to moveably cover the second entrance opening.

8. The card connector as claimed in claim 1, further comprising a shell enclosing the insulating housing.

9. The card connector as claimed in claim 8, wherein the shell comprises a detachable plate disposed on a top plate of the shell, and wherein a spring is assembled to the detachable plate.

10. The card connector as claimed in claim 9, wherein one end of the spring presses a recessed portion recessed from an upper surface of the guiding device.

11. The card connector as claimed in claim 9, wherein the top plate of the shell defines a large opening, and wherein the detachable plate covers an approximately middle portion of the large opening.

12. The card connector as claimed in claim 11, wherein the top plate is formed with a resilient arm beside the large opening, and wherein a cut is fanned between the detachable plate and the resilient arm to let the guiding device pass through when the first card is inserted into the receiving space.

13. A card connector, comprising:
an insulating housing defining a receiving space with a first entrance opening in front of said receiving space;
first and second sets of contacts received in the insulating housing and exposed into the receiving space;
a protection door moveably covering the first entrance opening for receiving a first card, the protection door defining a second entrance opening smaller than the first entrance opening for receiving a second card;
a guiding device formed on a back side of the protection door and moveable together with said protection door for guidable insertion of the second card; and
the guiding device includes a support section; wherein when said protection door is moved to a first position to uncover the first entrance opening, the guiding device is essentially of a cantilever beam type; when said protection door is moved to a second position to cover the first entrance opening, the guiding device is essentially of a simple support beam type with additional support from said support section.

14. The card connector as defined in claim 13, wherein said support section is supported by said housing when said protection door is located in the second position.

15. The card connector as defined in claim 14, wherein said support section is mating member to couple to the housing.

16. The card connector as claimed in claim 13, wherein said protection door is moved with rotation.

* * * * *